Patented June 18, 1935

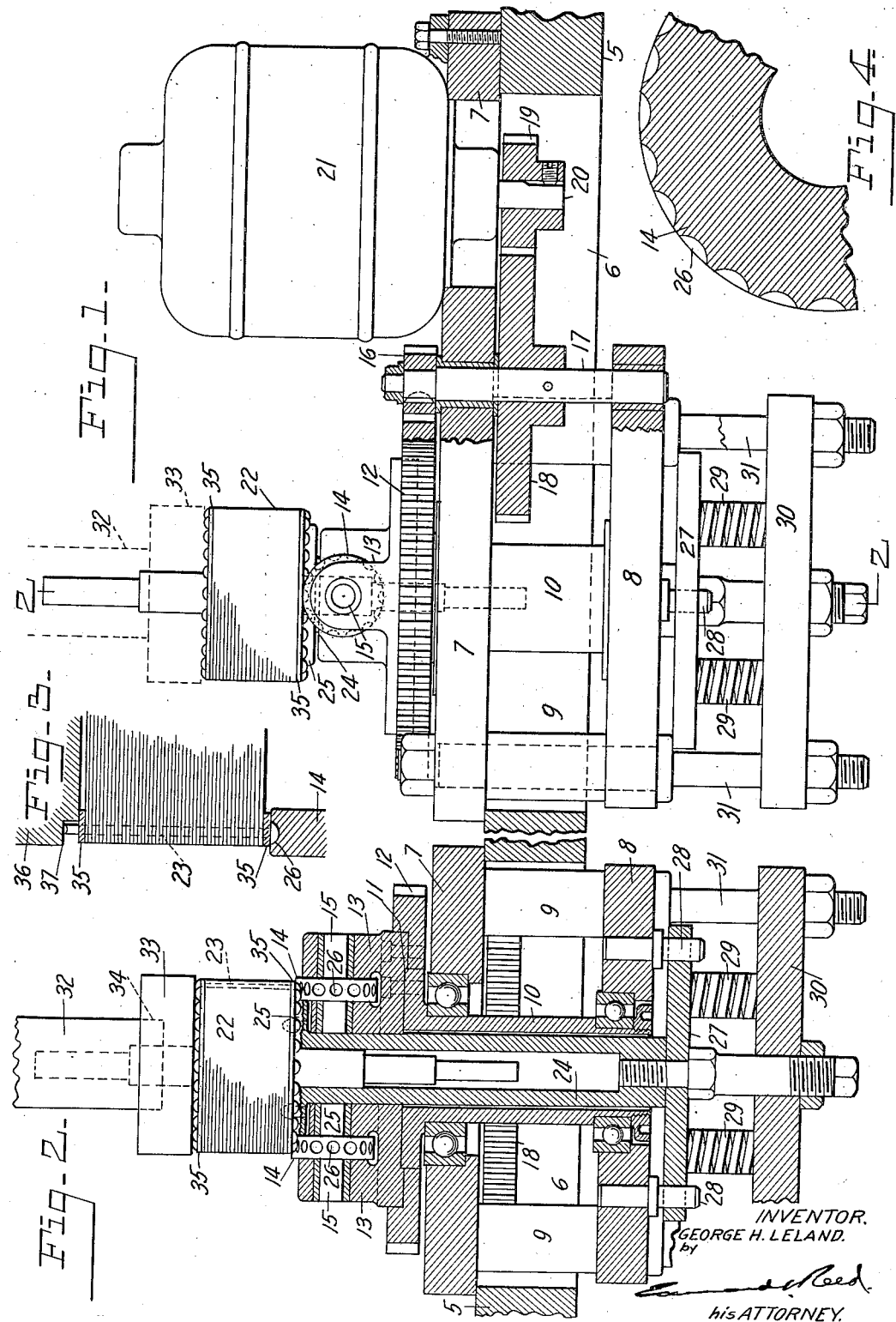

2,005,261

UNITED STATES PATENT OFFICE 2,005,261

RIVETING MACHINE

George H. Leland, Dayton, Ohio, assignor of one-half to The Leland Electric Company, Dayton, Ohio, a corporation of Ohio Application May 24, 1933, Serial No. 672,564

15 Claims. (Cl. 78—48)

This invention relates to a riveting machine and is designed primarily for riveting the ends of the rods of a rotor of the squirrel cage type.

One object of the invention is to provide such a machine which by one operation will rivet all the rods at one end of the rotor and by a second operation will rivet all the rods at the other end of the rotor.

A further object of the invention is to provide such a machine which will provide the ends of the rods with uniformly rounded heads of an attractive appearance.

A further object of the invention is to provide such a machine with a rotary riveting member to successively engage and upset the ends of a series of rivets or connecting members.

A further object of the invention is to provide such a machine which will be simple in its construction and rapid in its operation.

A further object of the invention is to provide such a machine which can be installed in a press of standard construction.

Other objects of the invention will appear as the mechanism is described in detail.

In the accompanying drawing Fig. 1 is a side elevation of a mechanism embodying my invention, partly in section; Fig. 2 is a vertical sectional view taken on the line 2—2 of Fig. 1, partly broken away, and showing the rotor and pressure plate in elevation; Fig. 3 is a fractional detail view showing a portion of the pressure plate used in the initial operation; and Fig. 4 is a sectional detail view of a portion of one of the riveting rollers.

In the drawing I have illustrated one embodiment of my invention and have shown the same as designed primarily for riveting the rods of a rotor but it will be understood that this particular embodiment has been chosen for the purpose of illustration only and that the mechanism may take various forms and may be used in connection with structures of various kinds with rods to be riveted, the term "rods" being herein used to include any elongated member or rivet the end of which is to be upset.

The particular mechanism here illustrated is designed to be mounted in and used in connection with a power operated press of ordinary construction, the bed plate of the press being shown at 5 and having an opening 6 through which a portion of the mechanism extends. As here shown, the mechanism comprises a supporting frame consisting of an upper plate 7 which rests upon the bed plate 5 and a lower plate 8 which, in the present instance, is arranged below the bed plate and is rigidly connected with the upper plate by connecting members or tie rods 9. The upper and lower plates of this frame are provided with alined bearings in which is mounted a tubular spindle 10 having its upper end enlarged, as shown at 11, and rigidly secured to a gear 12. Mounted on the upper surfaces of the enlarged portion 11 of the spindle and on the gear 12 are bearing brackets 13. The upper portion of each bracket is bifurcated to receive a riveting element, such as the roller 14, and each part of the bracket is provided with a bearing to receive the spindle 15 of the roller, the roller being preferably mounted for rotation about an axis substantially radial to the axis of the tubular spindle 10. Thus the tubular spindle and gear constitute a rotatable support for the two riveting rollers. It will be understood, however, that any suitable number of riveting rollers may be employed. This rotatable support may be driven in any suitable manner from any suitable source of power. As here shown, the gear 12 meshes with the pinion 16 on a vertical shaft 17, which is journaled in the upper and lower plates 7 and 8, and rigidly secured to this shaft is a gear 18 which meshes with a gear 19 and a shaft 20 of an electric motor 21.

The rotor, which is shown at 22, may be supported in any suitable manner which will maintain the several rods 23 in positions to be engaged by the riveting roller or rollers as the rotatable support rotates. In the present construction the support for the rotor comprises a tubular member 24 which extends into the tubular spindle 10 and is adapted to receive one end of the rotor shaft. The tubular member 24 has at its upper end a supporting plate or head 25 which is rigidly secured thereto and may, if desired, be formed integral therewith. This head is arranged between the riveting rollers 14 and is adapted to engage the end of the rotor core within the annular series of rods, which project beyond the end of the core. When the rotor is supported in this position the lower ends of a part of the rods will rest upon the riveting rollers 14. Each riveting element or roller is provided with a series of peripheral contact surfaces 26, arranged to engage and upset the ends of the rods as the riveting elements travel over the same. Each of these contact surfaces has a portion spaced inwardly from the peripheral path of the riveting element and arranged to engage the end of the rod with a longitudinal impact so as to upset the rod without bending the same. The contact surfaces may be of any suitable shape and are here shown as the concave recesses of a width greater than the diameter of the rods and adapted to form round rods on the upset ends of the rods. In order that the rods may be pressed firmly against the riveting rollers during the upsetting or riveting operation, the support for the rotor is longitudinally movable in the spindle 10 and means are provided for supporting the same normally in its uppermost position and for resisting its downward movement. As here shown, the part 24 of the support extends entirely through the tubular spindle 10 and is secured at its lower end to a plate 27 which is vertically movable on guide pins 28. Springs 29 are confined between the plate 27 and the frame member 30 which is secured to the main frame by means of the rods 31 and these parts normally move the rotor support to its uppermost position.

Downward pressure is exerted on the rotor by the action of the ram of the press. The ram has a downwardly extending part 32 which is hollow and adapted to receive the upper end of the rotor shaft. This downwardly extending part may be an integral part of the ram or it may be an attachment secured to a standard ram. Arranged between the part 32 of the ram and the upper end of the roller is a pressure plate 33 which is apertured to receive the rotor shaft and has in its upper surface a recess 34 to receive the lower end of the part 32 of the ram and to center the plate with relation thereto. This plate rests upon the upper ends of the rods to hold the same against upward movement under the action of the riveting rollers and to press the rotor downwardly as the riveting operation progresses, thus preventing any displacement of the rods in the rotor and causing uniform rounded heads to be formed on the ends of the rods by the repeated contact of the riveting rollers therewith. The rotor may be placed on the support with either end downward and the machine operated to upset the lower ends of the rods. When this has been completed the rotor is removed and mounted on the support in a reverse position and the machine then operated to upset the lower ends of the rods. During the first operation the upper ends of the rods project above the end ring 35 of the rotor for a considerable distance, while in the second operation the upper ends of the rods have been upset and are comparatively short, and it is therefore desirable to employ different pressure plates during the two operations. In order that the body or core of the rotor may be pressed firmly against the supporting plate 25 and the rods held against movement therein during the first riveting operation, the pressure plate employed for that operation is of the type shown at 36 in Fig. 3 and is recessed as shown at 37 to receive the projecting ends of the rods, the recesses being of such a depth that the upper ends of the rods will engage the top wall of the recess and the body of the plate will engage the upper end ring 35. The plate may be provided with one continuous recess 37 or it may have a series of separated recesses to receive the respective rods. For the second riveting operation the pressure plate may be provided with a flat lower surface which will rest directly upon the heads of the rods as shown at 33.

The downward pressure of the ram on the rotor, against the action of the yieldable lower support, accomplishes another result which is important. In constructing a rotor of this kind the several laminations are pressed tightly onto the shaft in snug engagement one with the other and the frictional contact of the laminations with the shaft hold the inner portions thereof in engagement one with the other but the outer or peripheral portions of the laminations tend to separate, prior to the riveting of the rotor. It is important that the outer portion of these laminations should be pressed into firm engagement and held in engagement during the riveting operation. The springs 29 are therefore made quite heavy and offer a strong resistance to the downward movement of the supporting plate 25 which engages the lower end of the rotor. The downward pressure of the ram, in order to move the rods into proper engagement with the rollers, must overcome the resistance of the springs 29 and in so doing will press the laminations of the rotor into firm engagement one with the other and hold them in such engagement during the riveting operation. With the laminations so held the progressive action of the riveting rollers on the ends of the rods will cause the latter to be upset tightly against the lower end ring and at the end of the riveting operations the laminations will be tightly riveted in proper engagement one with the other.

In the operation of the mechanism the rotor is mounted upon its support, the pressure plate 36 placed in position thereon and the ram lowered into engagement with the pressure plate. The motor is then started and the rotatable support driven at a relatively high speed to cause the same to successively engage the ends of the several rods and to gradually upset the same. The end of the rods enter the recesses 26 and the upset ends conform in shape to these recesses. A short period of rotation is sufficient to complete the riveting operation. The motor is then stopped, the ram elevated, the rotor removed and again mounted on its support in a reverse position, and the pressure plate 33 placed thereon, after which the ram is again moved into engagement with the pressure plate and the motor started to effect the second riveting operation. It will be understood that during each riveting operation the ram is gradually lowered by the usual press mechanism to maintain the desired pressure on the rods and to gradually lower the rotor as the riveting operation progresses. The motor may be manually controlled or it may be provided with an automatic switch of any suitable type which will be closed as the ram moves downwardly and will be opened as the ram moves upwardly.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a riveting machine, a support for a structure having a series of rods projecting beyond one end thereof, a riveting roller having recesses extending along its path of rotation to receive in order the projecting ends of said rods and upset the same, a support for said roller, means for imparting movement to one of said supports to cause the recesses of said roller to successively engage the ends of the rods, and means for exerting pressure on said rods during the movement of said movable support.

2. In a riveting machine, a support for a structure having a series of rods projecting beyond one end thereof, a riveting roller having recesses extending along its path of rotation to receive in order the projecting ends of said rods and upset the same, a support for said roller, means for imparting movement to one of said supports to cause the recesses of said roller to successively engage the ends of the rods, and means for moving one of said supports toward the other support as the riveting operation progresses.

3. In a riveting machine, a support for a structure having an annular series of rods projecting beyond one end thereof, a rotatable support, a riveting roller rotatably mounted on said rotatable support and arranged to successively engage the ends of said rods as said rotatable support is rotated, said roller having a series of peripheral recesses to receive in order the ends of the respective rods and upset the same, means to rotate said rotatable support, and means to exert pressure on said structure.

4. In a machine for riveting the ends of the rods of a rotor, a rotatable support having a tubular spindle, a riveting roller rotatably mounted on said support, a second support to engage said rotor and support the same with said rods in a position to be successively engaged by said roller as said rotatable support rotates, said second support having a tubular part extending into said tubular spindle and adapted to receive the rotor shaft, means for rotating said rotatable support, and means acting on said rotor to press the same toward said roller.

5. In a machine for riveting the ends of the rods of a rotor, a support rotatable about a vertical axis and having a tubular spindle, a riveting roller rotatably mounted on said support, a second support to engage said rotor and support the same with said rods in a position to be successively engaged by said roller as said rotatable support rotates, said second support having a tubular part mounted for longitudinal movement in said tubular spindle and adapted to receive the rotor shaft, yieldable means to resist the downward movement of said second support, means to exert downward pressure on said rotor, and means to rotate said rotatable support.

6. In a machine for riveting the ends of the rods of a rotor, a support rotatable about a vertical axis and having a tubular spindle, a riveting roller rotatably mounted on said support, a second support to engage said rotor and support the same with said rods in a position to be successively engaged by said roller as said rotatable support rotates, said second support having a tubular part mounted for longitudinal movement in said tubular spindle and adapted to receive the rotor shaft, yieldable means to resist the downward movement of said second support, a pressure member to engage the upper ends of said rods, means to press said member downwardly, and means to rotate said rotatable support.

7. In a riveting machine, a support for a structure having a series of connecting members the ends of which are to be upset, a second support, a riveting roller mounted on said second support for rotation about an axis transverse to said connecting members and having a series of recesses spaced about the periphery thereof to engage the ends of said connecting members, and means for imparting movement to one of said supports to cause said recesses to engage the ends of said connecting members in order to upset the same.

8. In a riveting machine, a rotatable riveting member having a series of recesses extending along its path of rotation and adapted to engage in order the ends of a series of connecting members and form rounded heads thereon.

9. In a riveting machine, a support for a structure having a series of connecting members, the ends of which are to be upset, a rotatable riveting element having a series of separate contact surfaces spaced one from the other about the periphery of said element and consisting of individual indentations in the general peripheral contour of said element and spaced apart a distance substantially equal to the distance between adjacent connecting members, and means for imparting bodily movement to said riveting element to cause said contact surfaces to engage the ends of said connecting members in order and upset the same.

10. In a riveting machine, a support for a structure having a series of connecting members, the ends of which are to be upset, a rotatable riveting element having a series of peripheral contact surfaces spaced one from the other circumferentially of said element, each of said surfaces having a portion spaced from the axis of said element a radial distance less than the length of the radii of those parts of said element which are between adjacent contact surfaces, whereby each contact surface will engage the end of a connecting member with a longitudinal impact, and means for imparting bodily movement to said riveting element to cause said contact surfaces to engage the ends of said connecting members in order and upset the same.

11. In a riveting machine, a yieldable support for a structure having an annular series of rods projecting beyond one end thereof, a second support mounted adjacent to the projecting ends of said rods for rotation about the axis of said annular series of rods, a riveting element rotatably mounted on said second support and having a series of peripheral contact surfaces spaced one from the other circumferentially of said element and each having a portion spaced inwardly from the peripheral path of said element, adjacent contact surfaces being separated one from the other by peripheral parts of said element which extend radially beyond said inwardly spaced parts of said contact surfaces, means for rotating said second support, and means for pressing said structure against said yieldable support to hold said rods in operative engagement with said riveting element as the riveting operation progresses.

12. In a riveting machine, a rotatable riveting element having a series of separate peripheral contact surfaces spaced one from the other circumferentially of said element, each contact surface having a part spaced inwardly from the peripheral path of said element, and adjacent contact surfaces being separated one from the other by peripheral parts of said element which extend radially beyond said inwardly spaced parts of said contact surfaces, said contact surfaces being arranged to engage in order and upset the ends of a series of rivets or the like.

13. In a riveting machine, a support for a structure comprising a laminated body and an annular series of rods extending through said body, said support having a part arranged in supporting relation to the lamina at one end of said body, a second support, a riveting element rotatably mounted on said second support, means for rotating one of said supports to cause said riveting element to successively engage the adjacent ends of said rods, and means for exerting pressure on the lamina at that end of said body opposite the first mentioned support to press the several laminae of said body into firm engagement one with the other and retain the same in such engagement during the riveting operation.

14. In a riveting machine, an axially movable support for a rotor comprising a laminated body and an annular series of rods extending through said body, said support having a part arranged in supporting relation to the lamina at one end of said body, yieldable means for resisting the movement of said support in one direction, a rotatable support, a riveting roller mounted on said rotatable support, means for actuating said rotatable support to cause said riveting roller to successively engage the adjacent ends of said rods, and a pressure device acting on the lamina at the opposite end of said body to move said body and the first mentioned support against the action of said yieldable means and thereby press the laminae of said body into engagement one with the other.

15. In a riveting machine, a yieldable support for a structure comprising a laminated body and an annular series of rods extending through the same, said support having a part to engage the lower end of said laminated body within said annular series of rods, a riveting roller mounted for rotation about the axis of said structure to successively engage the lower ends of said rods, means for rotating said roller, and a pressure device acting on the upper end of said laminated body and on said rods to force the same downwardly against the action of said yieldable support and thereby press the laminae of said body into engagement one with the other and press said rods against said riveting roller.

GEORGE H. LELAND.